(12) United States Patent
Ishiwata et al.

(10) Patent No.: US 11,379,896 B2
(45) Date of Patent: Jul. 5, 2022

(54) METHOD, MEDIUM, AND SYSTEM FOR MANUFACTURING USING AN APPARATUS MOUNTED ON A VEHICLE

(71) Applicant: TOYOTA JIDOSHA KABUSHIKI KAISHA, Toyota (JP)

(72) Inventors: Kazuyuki Ishiwata, Toyota (JP); Takayuki Yano, Nisshin (JP); Shin Sakurada, Toyota (JP); Megumi Amano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/723,258

(22) Filed: Dec. 20, 2019

(65) Prior Publication Data

US 2020/0225640 A1 Jul. 16, 2020

(30) Foreign Application Priority Data

Jan. 11, 2019 (JP) .............................. JP2019-003558

(51) Int. Cl.
*G06Q 30/00* (2012.01)
*G06Q 30/06* (2012.01)

(52) U.S. Cl.
CPC .............. *G06Q 30/0621* (2013.01); *G05B 2219/49023* (2013.01)

(58) Field of Classification Search
CPC ...... G05B 19/4099; G05B 2219/49023; G06Q 30/0621
See application file for complete search history.

(56) References Cited

U.S. PATENT DOCUMENTS

| | | | |
|---|---|---|---|
| 10,282,914 B1* | 5/2019 | Tran | A61B 5/742 |
| 2002/0032617 A1* | 3/2002 | Takahashi | G06Q 40/04 |
| | | | 705/26.1 |
| 2015/0052024 A1* | 2/2015 | Apsley | G06F 30/00 |
| | | | 705/26.81 |
| 2016/0170387 A1 | 6/2016 | Ihara | |
| 2019/0236534 A1* | 8/2019 | Kaneko | G05D 1/0274 |

FOREIGN PATENT DOCUMENTS

| | | |
|---|---|---|
| JP | 2006-244366 A | 9/2006 |
| JP | 2017-500635 A | 1/2017 |
| JP | 6075809 B2 | 2/2017 |
| JP | 2017-062553 A | 3/2017 |
| JP | 2017-142654 A | 8/2017 |

OTHER PUBLICATIONS

Boon, Wouter, and Bert Van Wee. "Influence of 3D printing on transport: a theory and experts judgment based conceptual model." Transport Reviews 38.5 (2018): 556-575. (Year: 2017).*

* cited by examiner

*Primary Examiner* — Matthew E Zimmerman
(74) *Attorney, Agent, or Firm* — Oblon, McClelland, Maier & Neustadt, L.L.P.

(57) ABSTRACT

An information processing apparatus mounted on a vehicle is provided with a control unit configured to acquire information indicating an item that a user desires to check for a product, acquire manufacturing data of a sample of the product capable of checking the item desired to be checked by using the acquired information, and output the manufacturing data to a sample manufacturing apparatus in the vehicle.

8 Claims, 6 Drawing Sheets

SAMPLE DB

| PRODUCTS ID | PATTERN | CHECKABLE ITEM | MANUFACTURING TIME | GRADE |
|---|---|---|---|---|
| ID-A | P1 | SIZE, WEIGHT | T1 | G1 |
| | P2 | SIZE | T2 | G2 |
| | P3 | PART 1 | T3 | - |
| | P4 | PART 2 | T4 | - |
| | P5 | PART 3 | T5 | - |

FIG. 5

VEHICLE DB

| VEHICLE ID | CORRESPOINDING PRODUCTS | LOCATION | TERMINAL INFORMATION |
|---|---|---|---|
| VID1 | ID-A | PO1 | |
| VID2 | ID-B | PO2 | |
| VID3 | ID-C | PO3 | |
| • | • | • | |
| • | • | • | |

321

METHOD, MEDIUM, AND SYSTEM FOR MANUFACTURING USING AN APPARATUS MOUNTED ON A VEHICLE

INCORPORATION BY REFERENCE

The disclosure of Japanese Patent Application No. 2019-003558 filed on Jan. 11, 2019 including the specification, drawings and abstract is incorporated herein by reference in its entirety.

BACKGROUND

1. Technical Field

The present disclosure relates to an information processing apparatus, an information processing method, and a program.

2. Description of Related Art

Conventionally provided is a maintenance method in which 3D data from replacement data is sent to a 3D printer installed at a maintenance center when a replacement part is out of stock (see, for example, Japanese Unexamined Patent Application Publication No. 2017-062553). Further, a 3D printer is provided, which manufactures an article by using 3D-printer input data generated from 3D data (see, for example, Japanese Patent No. 6075809). Moreover, a 3D object generating system is provided, which generates and displays a 3D object image of a room based on information on a floor plan of a user's room, input by the user using a customer's client (see, for example, Japanese Unexamined Patent Application Publication No. 2017-142654).

SUMMARY

The present disclosure is made to provide an information processing apparatus, an information processing method, and a program, which can provide a sample capable of recognizing an item that a user desires to check for a product.

An aspect of the present disclosure is an information processing apparatus mounted on a vehicle, including a control unit configured to acquire information indicating an item that a user desires to check for a product, acquire manufacturing data of a sample of the product with which the item desired to be checked is checkable by using the information, and output the manufacturing data to a sample manufacturing apparatus in the vehicle.

Aspects of the present disclosure may include an information processing method or a program, of the information processing apparatus stated above.

According to the present disclosure, it is possible to provide a sample with which an item that a user desires to check for a product is recognizable.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 illustrates an example of a data structure of a vehicle database;

DETAILED DESCRIPTION OF EMBODIMENTS

Figure 1:
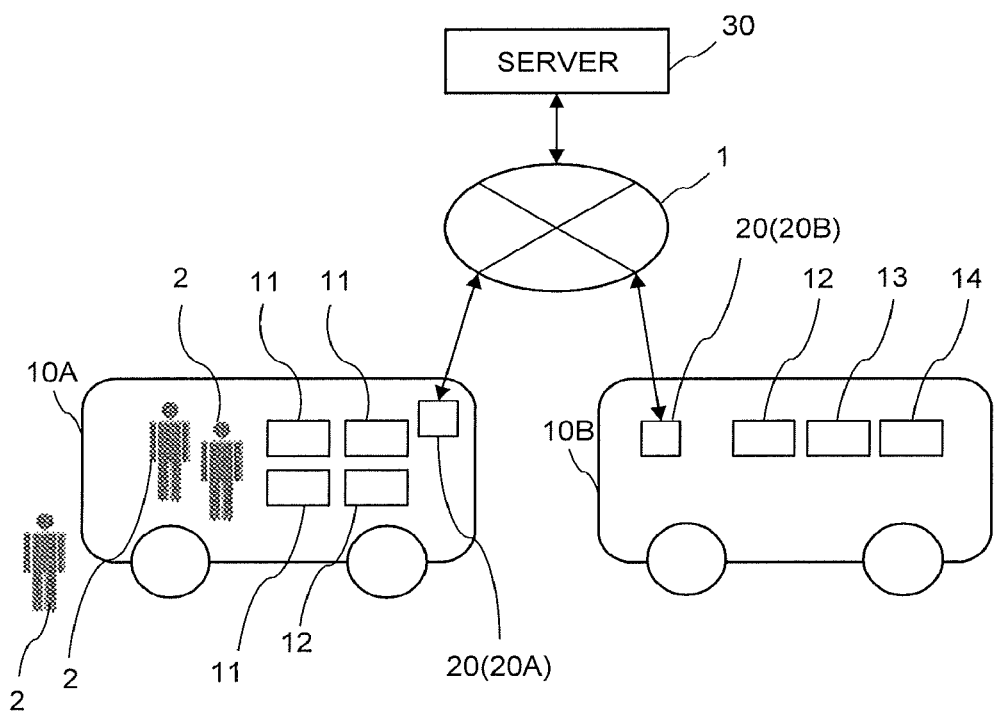
FIG. 1 is a schematic diagram of a system according to an embodiment.

Hereinafter, embodiments of the information processing apparatus, the information processing method, and the program will be described. An information processing apparatus mounted on a vehicle will be described as the information processing apparatus according to the embodiment. The information processing apparatus is provided with a control unit configured to acquire information indicating an item that a user desires to check for a product; acquire manufacturing data of a sample of the product capable of checking the item desired to be checked by using the information; and output the manufacturing data to a sample manufacturing apparatus in the vehicle.

The product is, for example, a product, the actual product of which is unseeable by the user in such a case where the product is out of stock in a store or only a catalog is prepared for browsing. The product may be of any kind as long as the sample is manufacturable in the vehicle. The product may include, for example, a product that the user is interested in and a product that the user considers or desires to purchase. The store may be a mobile store using a vehicle, or may be a fixed store.

Items desired to be checked for a product correspond to various parameters of the product, which include, for example, includes at least one of a size, a shape, a weight, and a pattern of at least one of a color and a motif. The size of the product includes vertical size, horizontal size, height, thickness, length, inner diameter, outer diameter, volume, and the like.

The sample may be an actual product or an article that reproduces or simulates a part of the actual product. The "article that reproduces or simulates a part" includes an article that reproduces or simulates a size of the actual product, for example, at least one of vertical size, horizontal size, height, thickness, length, and diameter, which corresponds to the item desired by the user. Further, the "article that reproduces or simulates a part" also includes an article that reproduces or simulates a certain part among a plurality of parts into which the actual product is divided.

The manufacturing apparatus includes a 3D printer and an automatic loom. The manufacturing data is obtained by converting three-dimensional data of the product or the sample of the product into a format that is usable by the 3D printer. Further, in a case where the product is a woven fabric, the manufacturing data includes information, such as the size of the sample, as well as color and thickness of a yarn used for a material of the woven fabric. The sample of the woven fabric includes a part of the actual product, a miniature version of the actual product, and a cloth having a predetermined rectangle shape indicating a pattern of a color or a motif of the actual product, and other patterns. The manufacturing apparatus is not required to completely manufacture the sample automatically, and may manufacture the sample as an operation performed by a human, such as inputting data or supplying materials.

With an information processing apparatus according to the embodiment, in a case where the user desires to check an item for the product to which the user is unable to refer, the control unit is configured to acquire information indicating the item desired to be checked and to acquire manufacturing data of the sample of the product that can check such an item. The acquiring of the information may be a receiving of the information via a communication tool or a reading of the information stored in a storage medium. The manufacturing data may be acquired by, for example, generating the manufacturing data in the information processing apparatus, or issuing an external request outside of the information processing apparatus and receiving the manufacturing data as a result of the request.

The manufacturing data is output to the manufacturing apparatus installed in the vehicle, and the sample is manufactured by the manufacturing apparatus. The vehicle travels to a place where the sample is provided (for example, a store where the user visits), and the sample can be manufactured while the vehicle travels. Items other than the item desired to be checked, stated above, may be omitted or simplified in the sample. As Such, it is possible to shorten the manufacturing time of the sample and save materials required for the sample. Further, it is possible to show the sample to the user at an appropriate time (earlier) by shortening the time. The sample is lent or handed over to the user in the place where the sample is provided, and the user may recognize the item (size, weight, and the like) that he or she desires to check for the product by observing, holding, or touching the sample. Accordingly, even when the user cannot observe the actual product, the item desired to be checked may be checked so that the user's willingness to purchase the product may be stimulated and thus the user actually purchases the product.

Embodiments

Hereinafter, the information processing method according to the embodiment will be described with reference to drawings. A configuration of the embodiment is merely an example, and the present disclosure is not limited to the configuration of the embodiment.

System Configuration

FIG. 1 is a schematic diagram of a system according to an embodiment. In FIG. 1, the system includes an in-vehicle terminal 20A, an in-vehicle terminal 20B, and a server 30, which are connected to a network 1. The network 1 is, for example, a public communication network, such as the Internet, and may employ a WAN (Wide Area Network) or other communication networks. Further, the network 1 may also include a cellular network, such as Long Term Evolution (LTE) and a wireless network, such as a wireless Local Area Network (LAN, including Wi-Fi).

The in-vehicle terminal 20A is mounted on a vehicle 10A. The vehicle 10A is used as a mobile store in which a plurality of products 11 is loaded. The vehicle 10A stops at a predetermined location, exhibits the products 11 in the vehicle 10A or in the vicinity of the vehicle 10A, and welcomes a user (customer) 2 visiting the store. A product is sold to the user 2 who desires to purchase such a product.

In a case where the product (actual product) or the sample that the user 2 desires is not available due to the product or the sample being, for example, out of stock, the in-vehicle terminal 20A accepts information input by the user 2, which indicates an item that the user 2 desires to check for the product (hereinafter referred to as "item information"), and transmits to the server 30 via the network 1 a message (request message for providing a sample) including information indicating the product, the item information, and vehicle-related information (a vehicle ID, ID of the in-vehicle terminal 20A, location information of the in-vehicle terminal 20A (vehicle 10A), and the like).

The server 30 manages information relating to a plurality of vehicles 10B, each of which can manufacture the sample of the product capable of checking the item desired to be checked, such as information relating to the in-vehicle terminal 20B, information relating to the sample that can be manufactured, and location information of the in-vehicle terminal 20B (vehicle 10B). The server 30 selects one of the plurality of vehicles 10B based on a distance calculated from the locations of the vehicle 10A and the vehicle 10B, and transmits the information included in the request message for providing a sample to the in-vehicle terminal 20B, mounted on the selected vehicle 10B, via the network 1.

The in-vehicle terminal 20B is mounted on the vehicle 10B. The vehicle 10B is equipped with a car navigation device 12, a 3D printer 13, an automatic loom 14, and the like. The 3D printer 13 and the automatic loom 14 are examples of the "manufacturing apparatuses." The in-vehicle terminal 20B uses the information included in the request message for providing a sample, extracts a sample pattern from which the sample capable of recognizing the item desired to be checked is manufactured, from among a plurality of sample patterns, and acquires manufacturing data of the sample corresponding to the extracted sample pattern. This manufacturing data is output to the 3D printer 13 or the automatic loom 14, and the 3D printer 13 or the automatic loom 14 is allowed to manufacture the sample capable of recognizing the item desired to be checked. The car navigation device 12, the 3D printer 13, and the automatic loom 14 may also be provided in the vehicle 10A, and the sample may be manufactured in the vehicle 10A.

The vehicle 10B travels to a stopped location of the vehicle 10A (that is, the place where the sample is provided) by an automatic operation, or by a manual operation performed by a driver or a crew of the vehicle 10B. The sample is manufactured until a time when the traveling has concluded (arrival time at the place where the sample is provided) or until a time specified by the user 2 (designated time), which is later than the arrival time. The manufactured sample is provided to the user 2. In a case where the user 2 designates a time later than the arrival time, the sample may be manufactured continuously between the arrival time and the designated time. The manufactured sample is handed over to the user 2 and used by the user 2 as stated above. In the present embodiment, it is exemplified that the vehicle 10A used as the mobile store and the vehicle 10B that manufactures the sample are different vehicles. However, the vehicle 10B may be used as the mobile store while manufacturing the sample of the product not available in such a store.

In-Vehicle Terminal

Figure 2:
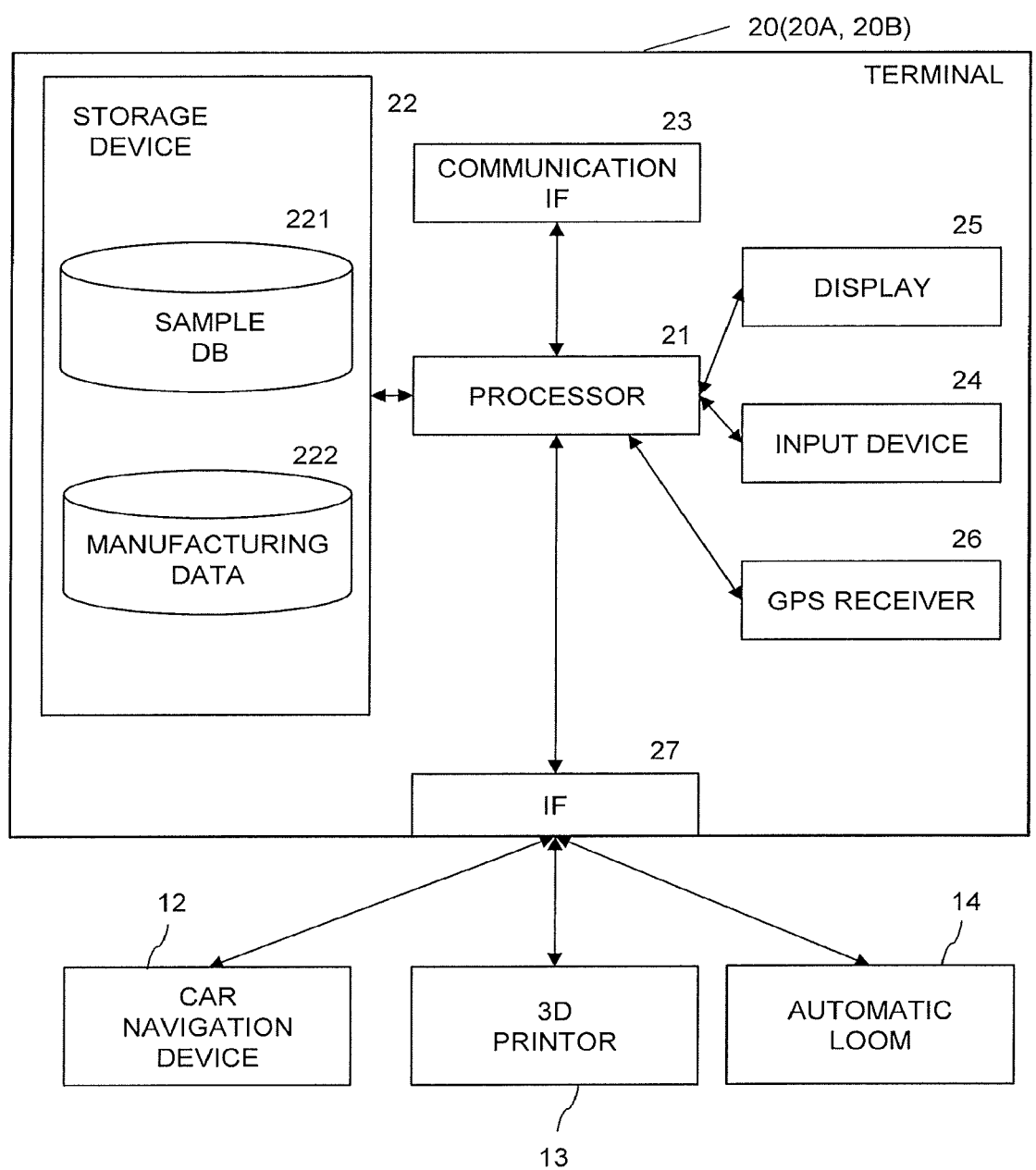
FIG. 2 illustrates a configuration example of a terminal that can be used as an in-vehicle terminal.

FIG. 2 illustrates a configuration example of a terminal 20 capable of being used as the in-vehicle terminal 20A and the in-vehicle terminal 20B. FIG. 2 also illustrates an example of a device connected to the in-vehicle terminal 20B in the vehicle 10B. The in-vehicle terminal 20B corresponds to an example of the "information processing apparatus mounted on a vehicle."

The terminal 20 may be a terminal device installed on the vehicle 10A or the vehicle 10B, or may simply be a terminal device mounted on the vehicle 10A or the vehicle 10B. The terminal 20 may be a laptop computer, a smart device, such as a smartphone or a tablet terminal, or a mobile terminal (portable communication terminal), such as a personal digital assistant (PDA) or a wearable computer.

The terminal 20 includes a processor 21, a storage device 22, a communication interface (communication IF) 23, an input device 24, a display 25, a global positioning system (GPS) receiver 26, and an interface (connector) 27.

The storage device 22 includes a main storage device and an auxiliary storage device. The main storage device is used as a storage area for programs and data, an area where a program is expanded, a working area of the program, a buffer area of communication data, and the like. The main storage device includes random-access memory (RAM), or a combination of RAM and read-only memory (ROM). The auxiliary storage device is used as a storage area for data and programs. The auxiliary storage device includes, for example, a nonvolatile storage medium, such as a hard disk (SSD), flash memory, and electrically erasable programmable read-only memory (EEPROM). The storage device 22 is provided with a sample database (sample DB) 221 and a manufacturing data storage unit 222. The manufacturing data storage unit 222 stores manufacturing data of samples of several kinds. The manufacturing data includes instructions relating to sample manufacturing procedures in the 3D printer 13 and the automatic loom 14.

The communication IF 23 manages wireless communication according to a wireless communication system (LTE, wireless LAN (Wi-Fi), and the like) supported by the terminal 20. The input device 24 includes, for example, a key, a button, a pointing device, and a touchscreen, and is used for inputting information. The display 25 is, for example, a liquid crystal display, and displays information and data. The GPS receiver 26 receives a signal from a GPS satellite and calculates a location of the terminal 20. The location of the terminal 20 is used as the location of the vehicle 10A or the vehicle 10B. The interface (IF) 27 is connected to the car navigation device 12, the 3D printer 13, and the automatic loom 14, which are mounted on the vehicle 10B. The 3D printer 13 and the automatic loom 14 receive the manufacturing data output from the terminal 20, and manufacture the sample according to the manufacturing data.

The processor 21 is, for example, a central processing unit (CPU). The processor 21 performs various processes by executing various programs stored in the storage device 22. Details of the processes will be described below.

Server Configuration

Figures 3, 4:
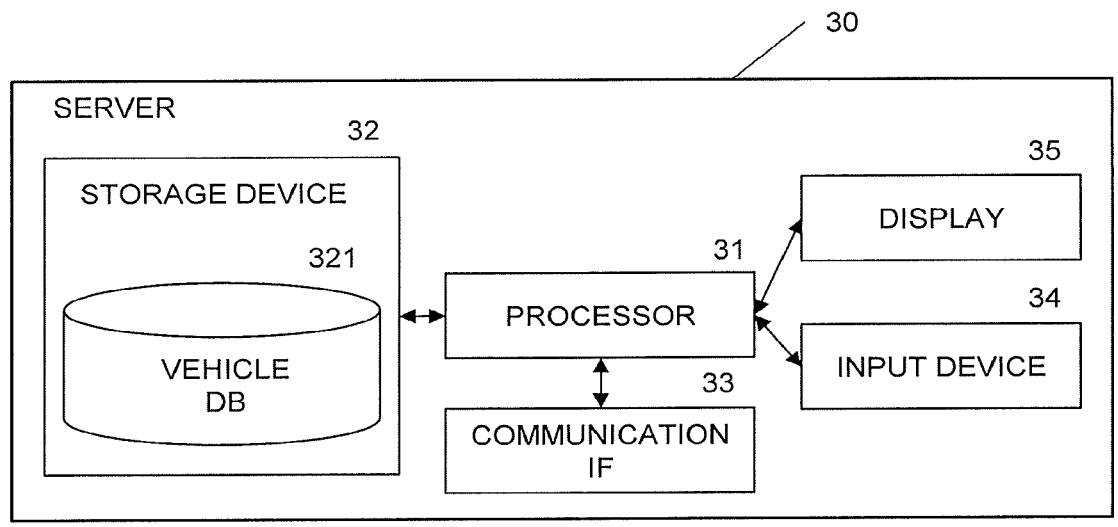
FIG. 3 illustrates a configuration example of a server.
FIG. 4 illustrates an example of a data structure of a sample database.

FIG. 3 illustrates a configuration example of the server 30. The server 30 may include a general-purpose information processing apparatus, such as a personal computer (PC) or a workstation, or, a dedicated information processing apparatus, such as a server machine. The server 30 includes a processor 31, a storage device 32, a communication interface (communication IF) 33, an input device 34, and a display 35. The storage device 32 stores a vehicle database (vehicle DB) 321.

The same examples as those described for the processor 21, the storage device 22, the input device 24, and the display 25 may be employed for the processor 31, the storage device 32, the input device 34, and the display 35. However, depending on the use and the purpose of use, a device having a different performance from that employed in the terminal 20 is employed.

The communication IF 33 manages communication processing. As the communication IF 33, for example, a network interface card (NIC) may be employed. The communication IF 33 transmits and receives data and information to and from the in-vehicle terminal 20A and the in-vehicle terminal 20B via the network 1. The processor 31 performs various processes by executing various programs stored in the storage device 32.

A plurality of CPUs or a multi-core type CPU may be employed as the processor 21 and the processor 31. At least a part of the processes performed by the CPU may be executed by a processor other than the CPU, such as a digital signal processor (DSP) or a graphical processing unit (GPU), a dedicated or general-purpose integrated circuit, such as an application specific integrated circuit (ASIC) or a field programmable gate array (FPGA), or a combination of the processor and the integrated circuit. The combination is called, for example, a microcontroller (MCU), a system-on-a-chip (SoC), a system LSI, or a chip set. Further, a part of the processes performed by the processor 21 may be performed by the processor 31 and vice versa.

Sample DB

FIG. 4 illustrates an example of a data structure of a sample DB 221. FIG. 4 exemplifies a data structure (table) of the information stored for a product (a product of which product ID (product identification information) is "ID-A"). The sample DB 221 has a table illustrated in FIG. 4 for each product.

The sample DB 221 stores a sample pattern, checkable items, a manufacturing time, and a grade in association with the product ID. The sample pattern is information indicating several kinds of sample patterns that the manufacturing apparatus can manufacture for the product. In the example illustrated in FIG. 4, five sample patterns are prepared for the product "ID-A". The number of sample patterns may be more or less than five. In the example of FIG. 4, sample patterns P1, P2 are patterns for manufacturing a sample representing the whole product, and sample patterns P3 to P5 are patterns for manufacturing a sample representing a part of the product.

The checkable items indicate items (parameters) that may be checked by the user 2 in the sample manufactured in accordance with the sample pattern. For example, a sample having the same size (length×width×height) and weight as those of the actual product is manufactured using the sample pattern P1. Consequently, it is a sample pattern suitable for users who desire to check the size and weight of the product.

The sample pattern P2 allows manufacturing of a sample which has the same size as that of the actual product but may have a weight different from that of the actual product. Consequently, the sample pattern P2 is a sample pattern suitable for users who desire to check the size only, without caring about the weight. Since the sample pattern P2 does not need to be processed to have the same weight as that of the actual product, a manufacturing time T2 of the sample pattern P2 is shorter than a manufacturing time T1 of the sample pattern P1.

Sample patterns P3, P4, P5 are for manufacturing samples which, in a case where the product "ID-A" is divided into three parts (for convenience, a right side part, a center part, and a left side part), respectively simulate the actual size of each part. Consequently, they are sample patterns suitable for users who desire to check a shape of each part. As an example, the manufacturing time is T3>T4>T5, for example, T3 is longer than T5.

A sample pattern kind is not limited to the sample patterns stated above. For example, a plurality of sample patterns may be prepared, which has the same checkable items but different accuracy as a model, for example, a front surface has the same unevenness as that of the actual product but the processing of a rear surface is omitted.

A grade is an index indicating accuracy of the sample as a model. For example, the sample pattern P1 and the sample pattern P2 are respectively used for manufacturing a sample of which the size can be checked. However, since the sample pattern P1 also coincides with the actual product in terms of the weight, a grade G1 of the sample pattern P1 is higher than a grade G2 of the sample pattern P2.

Vehicle DB

FIG. 5 illustrates an example of a data structure of a vehicle DB 231. The vehicle DB 231 is used for management of the vehicle 10B (vehicle for manufacturing samples). The vehicle DB 231 includes a plurality of records prepared for each vehicle 10B. The record stores, as elements, corresponding products, a location, and terminal information associated with a vehicle ID.

The vehicle ID is identification information of the vehicle 10B. A product ID of a product for which a sample can be manufactured is stored as information on the corresponding product. The location is a current location of the vehicle 10B. The terminal 20B stores a location periodically acquired using the GPS receiver 26. The terminal information is information related to the in-vehicle terminal 20B mounted on the vehicle 10B, such as identification information (ID) and an address of the in-vehicle terminal 20B.

Operation Example

Figure 6:
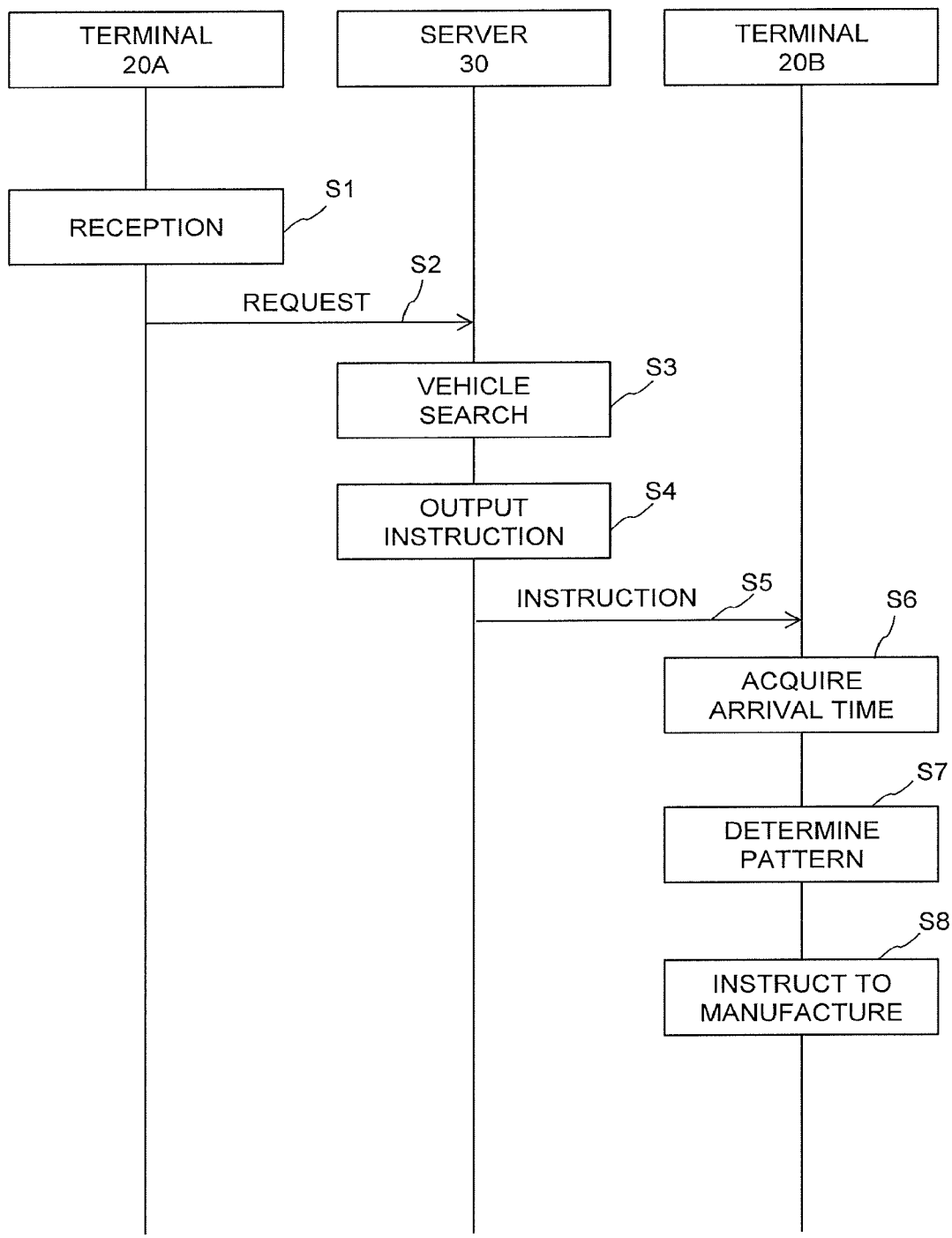
FIG. 6 is a sequence diagram illustrating operation examples of the in-vehicle terminal and the server.

FIG. 6 is a sequence diagram illustrating operation examples of the in-vehicle terminal 20A, the server 30, and the in-vehicle terminal 20B. Each operation (process) of the in-vehicle terminal 20A and the in-vehicle terminal 20B is executed by the processor 21, and a process in the server 30 is performed by the processor 31.

It is assumed that a certain product (the product with the product ID "ID-A") is out of stock in the mobile store of the vehicle 10A, and the user 2 cannot observe the actual product. In this case, the user 2 or an operator of the in-vehicle terminal 20A in the mobile store inputs information (size, weight, and the like) indicating items desired to be checked for the product by using the input device 24. The processor 21 of the in-vehicle terminal 20A receives the information desired to be checked (S1), generates a request message for manufacturing a sample, and transmits the message to the server 30 (S2).

The request message for manufacturing a sample includes the ID of the in-vehicle terminal 20A, the ID of the vehicle 10A, the product ID, information indicating the item desired to be checked, information indicating the location of the in-vehicle terminal 20A (vehicle 10A), and the like. Further, the sample manufacturing request message may include a sample pattern designated in the in-vehicle terminal 20B, instead of the information indicating the item desired to be checked. Moreover, a time at which the user 2 can wait for the arrival of the sample may be included in the request message for manufacturing a sample as the designated time by operating the in-vehicle terminal 20A. Furthermore, grade information designating the grade of the sample may be included in the request message for manufacturing a sample by operating the in-vehicle terminal 20A.

In the server 30, the processor 31 receives the request message for manufacturing a sample, and extracts the vehicle 10B that can manufacture the sample of the product with the product ID and is located at the shortest distance from the location of the vehicle 10A (S3: vehicle search) referring to the vehicle DB. However, a selection algorithm of the vehicle 10B is not limited to the algorithm stated above, and another selection method may be employed.

The processor 31 uses the terminal information (stored in the vehicle DB) of the in-vehicle terminal 20B of the extracted vehicle 10B to output a sample manufacturing instruction including the information (stated above) included in the request message for manufacturing a sample (S4). The instruction is transmitted to the in-vehicle terminal 20B (vehicle 10B) (S5).

In the terminal 20B, the processor 21 inputs the location information of the vehicle 10A that transmits the sample manufacturing instruction to the car navigation device 12 as destination information. The car navigation device 12 calculates a route to the location of the vehicle 10A, calculates the estimated arrival time, and transmits the calculated results to the in-vehicle terminal 20B. Thus, the processor 21 of the in-vehicle terminal 20B acquires the arrival time (S6).

Figure 7:
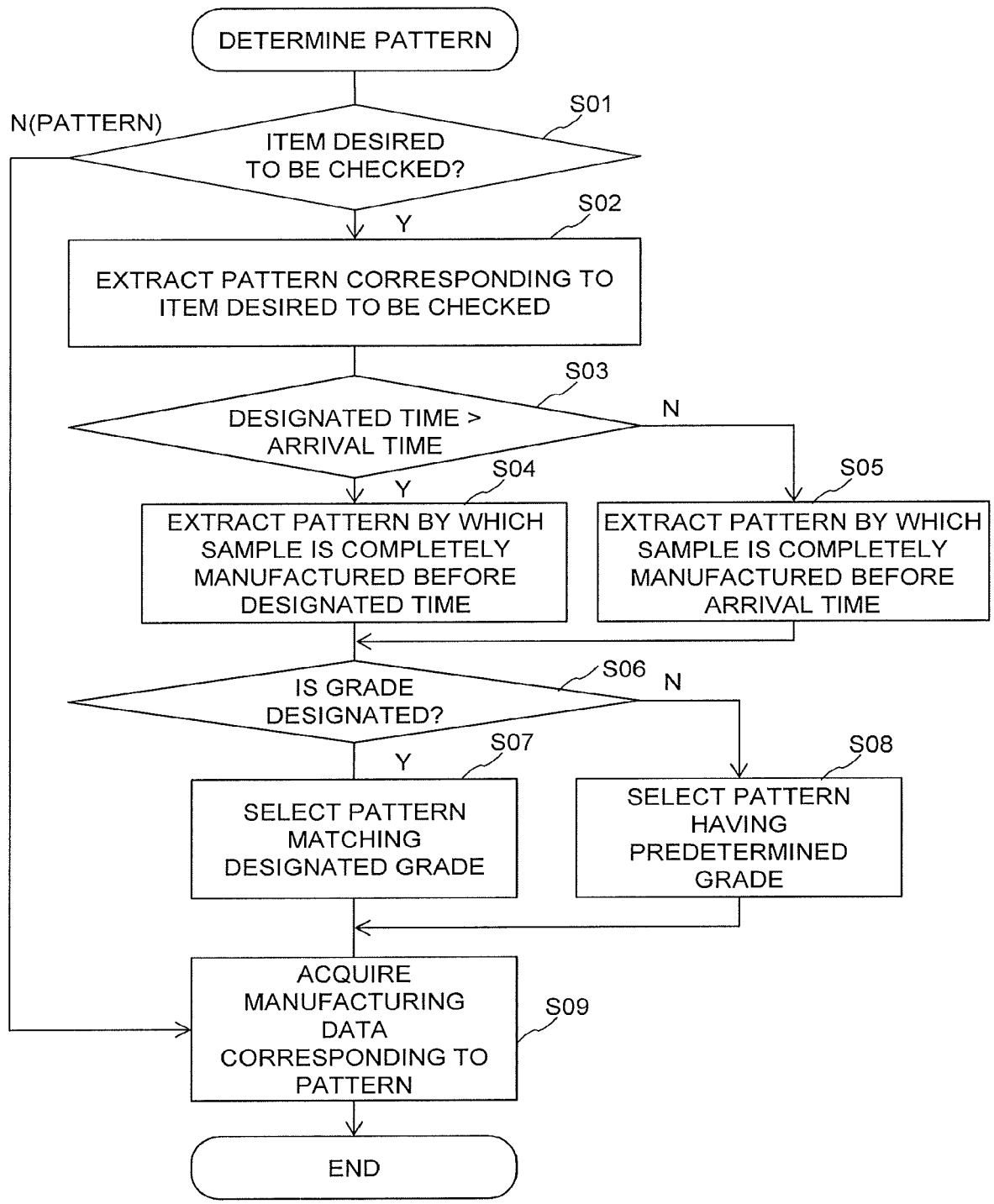
FIG. 7 is a flowchart illustrating an example of a sample pattern determining process.

Next, the processor 21 performs a sample pattern determination process (S7). FIG. 7 is a flowchart illustrating an example of the sample pattern determination process. In S01, the processor 21 determines whether the information indicating the item desired to be checked is included in the sample manufacturing instruction. In a case where it is determined that the item desired to be checked is included, the process proceeds to S02. In a case where the information indicating the sample pattern is included instead of the item desired to be checked, the process proceeds to S09.

In S02, the processor 21 extracts a sample pattern corresponding to the product ID and the item desired to be checked referring to the sample DB 221. In S03, the processor 31 determines whether the designated time is included in the sample manufacturing instruction and whether the designated time is later than the arrival time. In a case where it is determined that the designated time is later than the arrival time, the process proceeds to S04. Otherwise, the process proceeds to S05.

In S04, the processor 21 extracts a sample pattern by which a sample is completely manufactured before the designated time (for example, the completion time for manufacturing calculated based on the manufacturing time is earlier than the designated time). In S05, the processor 21 extracts a sample pattern by which a sample is completely manufactured before the arrival time (for example, the completion time for manufacturing is earlier than the arrival time). Further, a margin time, considering a traffic delay situation for a travel route of the vehicle 10B, may be set for the arrival time and the designated time.

The processes of S06 to S08 are performed in a case where two or more sample patterns are extracted in the processes of S04 or S05, and the process proceeds to S09 in a case where only one sample pattern is extracted in the processes of S04 or S05.

In S06, the processor 21 determines whether the grade information designating the grade is included in the sample manufacturing instruction. In a case where it is determined that grade information is included, the process proceeds to S07. Otherwise, the process proceeds to S08.

In S07, the processor 21 selects a sample pattern that matches the designated grade (the grade designated by the grade information) from the extracted sample patterns. In S08, a sample pattern that matches a predetermined (preset) grade is selected from the extracted sample patterns.

In a case where the process proceeds to S09, the sample pattern remaining at this point is considered as a sample pattern used for manufacturing the sample. In S09, the processor 21 acquires the manufacturing data corresponding to the sample pattern from the manufacturing data storage unit 222. When the process of S09 ends, the process proceeds to S8 of FIG. 6.

In S8, the processor 21 outputs (supplies) the sample manufacturing instruction including the manufacturing data corresponding to the determined sample pattern to the manufacturing apparatus (the 3D printer 13 in the present embodiment). The 3D printer 13 manufactures the sample according to the manufacturing data. The manufacturing data may be output as an image or printed material, to which the operator of the manufacturing apparatus may refer.

When the destination (location of the vehicle 10A) is set and the arrival time is calculated, the vehicle 10B starts traveling with the location of the vehicle 10A as the destination. In the present embodiment, the driver of the vehicle 10B drives and moves the vehicle 10B to the location of the vehicle 10A according to the car navigation device 12, with the location of the vehicle 10A as the destination. Consequently, the sample is manufactured while the vehicle 10B is directed to the vehicle 10A, and the manufacturing is completed before the arrival time or the designated time.

The driver or the crew of the vehicle 10B provides the manufactured sample directly to the user 2 or via a store clerk of the mobile store of the vehicle 10A. The user 2 observes the sample (looking, holding, touching, and the like) and checks the item desired to be checked (size and weight). By recognizing the item desired to be checked using the sample, the user 2 can get important information for making a decision whether to purchase a product.

Advantageous Effect of Embodiment

According to the embodiment, the processor 31 (the example of the control unit) of the in-vehicle terminal 20B mounted on the vehicle 10B transmits the item desired to be checked, which indicates the item that the user 2 desires to check for the product, from the in-vehicle terminal 20A via the server 30. The manufacturing data of the sample of the product capable of checking the item desired to be checked is acquired using this information, and the manufacturing data is output to the sample manufacturing apparatus (3D printer 13), which is in the vehicle 10B. As such, the sample capable of recognizing the item desired to be checked can be created and delivered to the user 2.

In the embodiment, the sample DB 221 stores the plurality of sample patterns, each of which is capable of checking the item desired to be checked and has a different manufacturing time. The processor 21 of the in-vehicle terminal 20B extracts, from among the plurality of sample patterns, the sample pattern having the completion time for manufacturing, predicted from the manufacturing time, earlier than the arrival time from when the vehicle 10B travels and arrives at the location of the vehicle 10A (example of the place where the sample is provided) or the designated time specified by the user 2, and acquires manufacturing data of the sample corresponding to the extracted sample pattern. Consequently, the sample pattern by which the sample is completely manufactured during the traveling of the vehicle 10B is determined, therefore the sample may be provided to the user 2 more quickly. Energy consumption and materials for manufacturing can be saved by shortening the manufacturing time.

Further, in the embodiment, in a case where the plurality of sample patterns are extracted, each of which having the completion time for manufacturing of the sample, predicted from the manufacturing time, earlier than the arrival time or and the designated time, the processor 21 selects one of the plurality of sample patterns based on grade information of the sample of the product, designated by the user 2. Accordingly, a highly accurate sample may be provided without any time delays.

Others

The embodiments stated above are mere examples, and the present disclosure may be implemented with appropriate modifications within a scope of the disclosure.

Further, the process described as being performed by a single device may be executed in a shared manner by a plurality of devices. Alternatively, the process described as being performed by different devices may be executed by a single device. In the computer system, the hardware configuration (in-vehicle terminal configuration) for implementing each function may be flexibly changed.

The present disclosure may also be implemented by supplying a computer program for executing the functions described in the embodiments to a computer, and reading and executing the program via one or more processors included in the computer. Such a computer program may be provided to the computer by a non-transitory computer-readable storage medium connectable to a computer system bus, or may be provided to the computer via the network. Examples of the non-transitory computer-readable storage media include random disk, such as a magnetic disk (a floppy (registered trademark) disk, a hard disk drive (HDD), and the like) or an optical disc (a CD-ROM, a DVD disc, a Blu-ray disc, and the like), a read-only memory (ROM), a random access memory (RAM), an EPROM, an EEPROM, a magnetic card, a flash memory, an optical card, and random kind of media suitable for storing electronic instructions.

What is claimed is:

1. A system, comprising:
an information processing apparatus mounted on a vehicle; and
a manufacturing apparatus mounting on the vehicle, wherein
the information processing apparatus includes a processor configured to:
acquire information indicating an item that a user desires to check for a product, the item including a size of the product;
determine that a sample pattern, from among a plurality of sample patterns relating to the product each having a different manufacturing time, has a completion time for manufacturing, predicted from the manufacturing time, that is earlier than an arrival time from when the vehicle travels to and arrives at a place where a sample is provided or a designated time specified by the user, the plurality of sample patterns relating to the product including a first sample pattern for manufacturing a sample having a same size as the size of the product and a same weight as a weight of the product and a second sample pattern for manufacturing a sample having the same size as the size of the product and a weight different from the weight of the product;
extract the sample pattern based upon the item desired to be checked and the determination that the sample pattern has the completion time earlier than the arrival time or the designated time;
acquire manufacturing data of a sample of the product with which the item desired to be checked is checkable corresponding to the extracted sample pattern, the manufacturing data of the sample including data for manufacturing the sample of the product to have the same size as the size of the product and to have the weight different from the weight of the product; and output the manufacturing data of the sample to the manufacturing apparatus, the manufacturing apparatus is configured to:
receive the manufacturing data of the sample from the information processing apparatus; and
manufacture the sample based upon the manufacturing data of the sample, and a manufacturing time of the second sample pattern is shorter than a manufacturing time of the first sample pattern.

2. The information processing apparatus according to claim 1, wherein the item desired to be checked further includes at least one of a shape, a weight, and a pattern of at least one of a color and a motif of the product.

3. The information processing apparatus according to claim 1, wherein the processor is configured to extract the extracted sample pattern based on information, indicating a grade of the sample of the product, designated by the user from among a plurality of grades of the sample of the product.

4. An information processing method, comprising:
acquiring information indicating an item that a user desires to check for a product, the item including a size of the product;
determining that a sample pattern, from among a plurality of sample patterns relating to the product each having a different manufacturing time, has a completion time for manufacturing, predicted from the manufacturing time, that is earlier than an arrival time from when a vehicle travels to and arrives at a place where a sample is provided or a designated time specified by the user, the plurality of sample patterns relating to the product including a first sample pattern for manufacturing a sample having a same size as the size of the product and a same weight as a weight of the product and a second sample pattern for manufacturing a sample having the same size as the size of the product and a weight different from the weight of the product;
extracting the sample pattern based upon the item desired to be checked and the determination that the sample pattern has the completion time earlier than the arrival time or the designated time;
acquiring manufacturing data of a sample of the product with which the item desired to be checked is checkable corresponding to the extracted sample pattern, the manufacturing data of the sample including data for manufacturing the sample of the product to have the same size as the size of the product and to have the weight different from the weight of the product;
outputting the manufacturing data of the sample to a manufacturing apparatus mounted in the vehicle;
receiving, by the manufacturing apparatus, the manufacturing data of the sample; and
manufacturing, by the manufacturing apparatus, the sample based upon the manufacturing data of the sample,
wherein a manufacturing time of the second sample pattern is shorter than a manufacturing time of the first sample pattern.

5. A non-transitory computer readable medium storing a program, which when executed, causes an information processing apparatus mounted on a vehicle to perform a method, the method comprising:
acquiring information indicating an item that a user desires to check for a product, the item including a size of the product;
determining that a sample pattern, from among a plurality of sample patterns relating to the product each having a different manufacturing time, has a completion time for manufacturing, predicted from the manufacturing time, that is earlier than an arrival time from when the vehicle travels to and arrives at a place where a sample is provided or a designated time specified by the user, the plurality of sample patterns relating to the product including a first sample pattern for manufacturing a sample having a same size as the size of the product and a same weight as a weight of the product and a second sample pattern for manufacturing a sample having the same size as the size of the product and a weight different from the weight of the product;
extracting the sample pattern based upon the item desired to be checked and the determination that the sample pattern has the completion time earlier than the arrival time or the designated time;
acquiring manufacturing data of a sample of the product with which the item desired to be checked is checkable corresponding to the extracted sample pattern, the manufacturing data of the sample including data for manufacturing the sample of the product to have the same size as the size of the product and to have the weight different from the weight of the product;
outputting the manufacturing data of the sample to a manufacturing apparatus in the vehicle;
receiving, by the manufacturing apparatus, the manufacturing data of the sample; and
manufacturing, by the manufacturing apparatus, the sample based upon the manufacturing data of the sample,
wherein a manufacturing time of the second sample pattern is shorter than a manufacturing time of the first sample pattern.

6. The information processing apparatus according to claim 3, wherein each of the plurality of grades indicates a different level of accuracy of the sample of the product.

7. The information processing apparatus according to claim 1, wherein each of the plurality of sample patterns is a sample of one of a plurality of constituent parts of the product.

8. The information processing apparatus according to claim 1, wherein the manufacturing apparatus is a 3D printer or an automatic loom.

* * * * *